3,006,726
PROCESS FOR UPGRADING CRUDE ALKALI
METAL SULFATES
Wilbur Simon, Crystal Lake, Ill., assignor to Morton Chemical Company, Woodstock, Ill., a corporation of Delaware
No Drawing. Filed Jan. 26, 1959, Ser. No. 788,770
11 Claims. (Cl. 23—121)

This invention relates to the production of alkali metal sulfates and more particularly to a process of upgrading the crude alkali metal sulfates to a product having improved color and free-flowing characteristics.

Alkali metal sulfates are utilized for a variety of purposes in the chemical industry. For example, sodium sulfate or salt cake, as it is often termed, finds great utility in the paper making process, particularly in the production of kraft papers.

While alkali metal sulfates may be and are obtained by fractional crystallization of the crude salt deposits found in dry lake beds found in certain arid regions, there are several important commercial processes for producing alkali metal sulfates from alkali metal chlorides on a commercial basis. One such process involves the treatment of the corresponding alkali metal chloride salts, such as for example, sodium and potassium, with sulfur dioxide, water vapor and oxygen by the Hargreaves process. Broadly, the Hargreaves process involves the briquetting of an alkali metal chloride, such as sodium chloride, with a small amount of iron catalyst, and passing the reagent gases over the briquettes at elevated temperatures, usually from 800° to 1100° F. While this technique is eminently satisfactory, it has been found that the resulting product has certain undesirable characteristics due to impurities. For example, the crude sulfates from the Hargreaves process are subject to caking under humid conditions, thereby providing a handling and storage problem. It has been found that this caking tendency is due to the residual, unconverted alkali metal chloride. In the specific instance of salt cake (sodium sulfate) the small amount (i.e. 1 to 5 percent) of sodium chloride ordinarily present in this crude product, produces caking at relative humidity conditions ranging from 76% and above, whereas pure sodium sulfate cakes at a relative humidity of 93% or higher. Similar effects are readily observed with other crude alkali metal sulfate products produced by the Hargreaves method, such as for example, potassium sulfate containing potassium chloride as an impurity.

With particular reference to salt cake as produced by the Hargreaves process it might well be expected that the sodium chloride content would be reduced to the point where the contribution of the impurity to caking would be insignificant by carrying out that method over an extended period of time. Experience, however, has shown that this is not practical. The major difficulty appears to arise in the fact that a eutectic of sodium chloride and sodium sulfate forms when about 45 percent of the sodium chloride has been converted to sulfate. This eutectic mixture melts at 623° C. or 1170° F., fuses, and thereby occludes a portion of the sodium chloride from further reaction, and at the same time forms the characteristic hard cores found in the Hargreaves process briquettes.

Another undesirable characteristic of the crude alkali metal sulfate as produced by the Hargreaves method is the rather high color produced by the entrained iron catalyst in the ferric oxide form. This pigment, usually present in a concentration of from 0.05 to about 5 percent, produces a definite pink to red coloration to the salt cake, thereby detracting from its salability where a white product is desired. It has been found that iron catalysts as such are readily oxidized to ferric oxide by oxygen in the latter stages during the operation of the Hargreaves process, particularly after cooling in air.

Crude sulfates, as produced by the Mannheim process by the action of sulfuric acid on alkali metal chlorides, are also subject to similar undesirable effects as produced by residual alkali metal chloride and iron, and in addition contain residual bisulfate which not only acts as a caking agent at relative humidities of 50 percent or more, but is especially undesirable from the standpoint of the paper industry.

Inasmuch as the crude alkali metal sulfate products, such as those of the Hargreaves and Mannheim processes, inherently contain undesirable impurities, such as residual alkali metal chlorides, colored iron compounds, sodium bisulfate, and the like, it would be desirable to provide a method of upgrading and improving such materials.

Accordingly, it is one object of the present invention to provide a process for the upgrading of a crude alkali metal sulfate containing residual alkali metal chloride and colored iron compounds, to produce a white, free-flowing product.

Another object is the provision of a process to reduce the alkali metal chloride concentration in crude alkali metaal sulfates as produced by the Hargreaves and Mannheim processes.

A still further object is the provision of a process for upgrading a crude alkali metal sulfate of the Mannheim process to produce a product that is substantially free of alkali metal halide, alkali metal bisulfate and colored iron compounds.

A still further object is the provision of a process for upgrading sulfates produced by the Hargreaves process to a product that is substantially free of color.

A still further object is the provision of a process for upgrading a crude sodium sulfate produced by the Hargreaves and Mannheim processes to provide a white, free-flowing product.

These and other objects of the invention may be seen in the following specification and appended claims.

Accordingly it has been found that the foregoing objects are fulfilled by the process of the present invention which in one broad form comprises the upgrading of a crude alkali metal sulfate containing alkali metal chloride and an iron compound by treating said crude alkali metal sulfate in a finely divided state with a process gas containing sulfur dioxide, water and oxygen while maintaining the reaction mixture during said treatment at a temperature between about 800° F. and the fusion point of the reaction mixture until the alkali metal chloride content is reduced to a concentration of below about 0.3 percent by weight of the solid reactants, and thereafter maintaining said reaction at a temperature above about 1000° F. to convert the iron compounds to a white compound, whereby a white, free-flowing and substantially bisulfate-free product is produced.

Broadly, the present process may be advantageously employed in the upgrading of crude sulfates containing from 1 to 20 weight percent and usually from 1 to 5 weight percent of an alkali metal chloride and iron compounds in amounts of from 0.05 to 5 percent or more (calculated as $Fe_2O_3$). As exemplary of the more preferred starting materials are the crude sulfates as produced by the Hargreaves and Mannheim processes. In addition to the foregoing, the crude starting material may also (with especial reference to Mannheim process sulfate) contain a small amount of alkali metal bisulfate in an amount of from 1 to 20 weight percent, but usually from 1 to 5 weight percent.

Prior to treatment by the present method, the crude starting material should be reduced to a finely divided state, such as by grinding, crushing or the like. Generally it is preferred that the starting material be of such size as to pass 98% through a No. 4 mesh and most preferably pass a No. 20 mesh screen.

While the temperatures utilized may extend from as low as about 800° F. to as high as the fusion point of the reactants, the process can be economically carried out at a practical rate using temperatures of from 800 to 1400° F. in the initial stages of the treatment, i.e., the time required to reduce the concentration of alkali metal halide to less than 0.3 percent. After this initial treatment, the temperature should be maintained at 1000° F. or above, to convert the iron present therein to a white compound and concomitantly produce a white, free-flowing and substantially bisulfate-free product. One preferred embodiment of the present process involves a carrying out of the entire process at temperatures above about 1000° F.

The Hargreaves process gas utilized in the present method is conveniently obtained by the heating of pyrites or combustion of sulfur. The gaseous reactant contains, as indicated heretofore, sulfur dioxide, water and oxygen, the latter being most conveniently supplied in the form of air. The components of the gaseous mixture are present in varying amounts, such as 3 to 20 percent by volume of sulfur dioxide, 3 to 20 percent by volume of water (as vapor or steam) and from 94 to 60 percent air.

The treatment of the crude alkali metal sulfates by this process may be carried out by a number of techniques, using conventional apparatus. For example, the reactant gases may be passed through a heated bed of the granulated crude product, such as is provided by a tube furnace, for the requisite period of time.

The upgrading process may also be carried out under fluid bed conditions by passing the stream of gaseous reactants upwards through a bed of the finely divided particles of crude salt cake or other sulfate reactant to maintain the solids in a turbulent and agitated condition, using conventional and well known fluid bed apparatus and techniques. While fluid bed techniques are well adapted for the carrying out of the invention, another equally useful method involves the use of a rotary furnace or calciner wherein the granulated solids are passed countercurrent to the reacting gases.

Generally the time required to carry out the process of the present invention varies with the temperature employed. Thus at temperatures of about 800° F. the conversion rate is such that the residual alkali metal chloride is reduced to the desired low level (0.3 percent or less) in a period of about twenty-four hours. At the more preferred temperatures of 1000° F. or above, the reaction is quite rapid and conversion of the chloride to the 0.3 percent level is accomplished in from about one-half to four hours, although from one to two hours is usually sufficient to produce a product that is both free-flowing and free from the reddish colors produced by ferric oxide.

The following examples will illustrate the production of white, free-flowing alkali metal sulfates by the process of the present invention.

*Example 1*

Two hundred grams of a crude pink salt cake from the Hargreaves process containing 1.75 percent NaCl, 0.25 percent iron expressed as $Fe_2O_3$ and 1.3 percent $CaSO_4$ were ground and placed in a tube furnace and heated to 1000° F. While maintaining the temperature at 1000° F. a gas mixture containing 88 percent air saturated with water vapor and 12 percent $SO_2$ were passed at a rate of 500 milliliters per minute over the heated salt cake for two hours.

The product was removed from the furnace while still hot and cooled in air.

The following is a comparison of the starting material and final product:

| | Crude Hargreaves Salt Cake | Upgraded Product |
|---|---|---|
| NaCl, percent by weight | 1.7 | 0.06 |
| Iron (calculated as $Fe_2O_3$) percent by weight | 0.25 | 0.25 |
| Color | Pinkish-red | White |
| Caking [1] | Yes | No |
| Percent Moisture absorbed after exposure to 86% relative humidity for 16 hours | 3.6% | 0.5% |

[1] After exposure to 86% relative humidity for 16 hours.

*Example 2*

A salt cake from the Mannheim process containing 2.00 percent NaCl, 1.7 percent $NaSO_4$ and 0.10 percent $Fe_2(SO_4)_3$ was treated by the process and in the equipment described in Example 1.

The product contained no $NaHSO_4$, 0.06 percent NaCl, and was white and free-flowing after exposure to 86 percent relative humidity for sixteen hours.

*Example 3*

Ten parts by weight of a crude, granular, reddish colored potassium sulfate containing 2 percent potassium chloride and 0.25 percent ferric oxide were placed in a tube furnace and heated to about 1100° F. Process gas as described in Example 1 was passed through the crude sulfate for a period of two hours. The resultant product was white, free-flowing, and contained less than 0.06 percent potassium chloride. No caking was observed after exposure to an atmosphere of 86 percent relative humidity for sixteen hours.

From the foregoing examples it may be seen that the process of the present invention as applied to a crude alkali metal sulfate, such as a sodium and potassium sulfate from the Hargreaves or Mannheim processes, results in a product which is greatly improved with respect to color properties and free-flowing characteristics.

While the foregoing Example 1 is specific to an embodiment of the invention involving treatment of a crude sulfate composition containing a relatively small amount of alkali metal chloride as an impurity, it is also contemplated that the process of the present invention may be utilized to upgrade crude Hargreaves process salt cake wherein the concentration of sodium chloride may be as high as about 20 weight percent. Since the process of the present invention is exothermic, economic advantages may be obtained by using a crude material containing a relatively large proportion of alkali metal chloride. Other alkali metal sulfates containing a high percentage of chloride may be likewise employed as a starting material.

While the foregoing examples and discussion have been specific with reference to the upgrading and processing of crude sodium and potassium sulfates from the Hargreaves and Mannheim processes, it will be obvious to those skilled in the art that the process is also useful in the production of other refined, free-flowing, substantially noncaking alkali metal sulfates, in a like manner.

Generally, the crude alkali metal halides which are utilized as starting materials in the Hargreaves and Mannheim processes contain varying amounts of impurities which also appear in the alkali metal sulfate after the conversion. These impurities vary in amount and type depending upon the source of the raw material but do not appear to have any adverse effect on the sulfate product. Exemplary of such impurities are calcium sulfate and magnesium sulfate, which are often present in small amounts, usually not exceeding 1 or 2 percent by weight in crude crushed rock salt (sodium chloride or halite).

While the precise nature of the mechanisms involved in the formation of the white iron compound in the latter stages of the process is not completely understood, it is believed that the iron compound reacts to form a complex, stable salt of the formula $3M_2SO_4 \cdot Fe_2(SO_4)_3$ wherein M is an alkali metal, such as for example, sodium or potassium. In this specific connection it has been found that the formation of the complex occurs at temperatures of 1000° F. or above.

It has also been found that the above described iron complex is unstable at temperatures of above about 600° F. when alkali metal chloride is present in concentrations exceeding about 0.3 percent, resulting in decomposition to ferric oxide. Accordingly, to promote the formation of the white iron complex and minimize the formation of ferric oxide it is necessary that the last step in the process be carried out at the prescribed temperature and after the alkali metal halide concentration has been reduced to less than 0.3 percent.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A process for upgrading a crude alkali metal sulfate containing from 1 to 20 percent of an alkali metal chloride and 0.05 to 5 percent of an iron compound calculated as ferric oxide, which comprises treating said crude alkali metal sulfate in a granular state with a process gas containing sulfur dioxide, water and oxygen, maintaining the temperature of reaction during said treatment at a temperature of between about 800° F. and below the fusion point of the reaction mixture until the alkali metal chloride content is reduced to a concentration of below about 0.3 percent by weight of the solid reactant, and thereafter continuing said reaction at a temperature above about 1000° F. to convert the iron compounds to a white compound whereby a white, free-flowing, substantially bisulfate-free composition is produced.

2. A process for upgrading a crude alkali metal sulfate containing from 1 to 20 percent of alkali metal chloride, and from 0.05 to 5 percent of an iron compound calculated as ferric oxide, by treating said crude sulfate in a finely divided condition with a process gas containing sulfur dioxide, water and oxygen while maintaining the solid reactants at a temperature between about 800 and 1400° F. for a period of time sufficient to reduce the alkali metal chloride content of the solid reactant to a concentration below about 0.3 percent, and thereafter maintaining the temperature of the reaction mixture above about 1000° F. to convert said iron therein to a white compound, whereby a white, free-flowing, substantially bisulfate-free composition is produced.

3. The process of claim 1 wherein the alkali metal chloride is present in the starting material at a concentration of from about 1.0 to about 5 weight percent thereof.

4. The process of claim 1 wherein the alkali metal is sodium.

5. The process of claim 1 wherein the alkali metal is potassium.

6. A process for upgrading a crude alkali metal sulfate containing from 1 to 20 weight percent sodium chloride, and from 0.05 to 5 weight percent of an iron compound calculated as ferric oxide, which comprises treating said crude sulfate in a finely divided condition with sulfur dioxide, water vapor and oxygen at a temperature above about 1000° F. and below the fusion point of the reaction mixture for a period of time sufficient to reduce the residual sodium chloride in said crude sulfate to a maximum concentration of about 0.3 percent and convert the iron compounds to a white compound whereby a white, free-flowing, substantially bisulfate-free composition is produced.

7. A process for producing a white, free-flowing sodium sulfate which comprises treating a finely divided crude salt cake from the Hargreaves process containing from about 1 to about 20 weight percent sodium chloride, and from about 0.05 to about 5 percent of an iron compound calculated as ferric oxide with gaseous sulfur dioxide, water, and oxygen at a temperature of from about 800 to the fusion point of said mixture for a period of time sufficient to reduce the residual sodium chloride in said salt cake to a maximum concentration of below about 0.3 percent and thereafter maintaining the temperature of the reactants above about 1000° F. to convert the iron compounds contained therein to a white compound whereby a white, free-flowing composition is produced.

8. A process for upgrading a crude salt cake which comprises treating a finely divided crude sodium sulfate from the Hargreaves process containing from about 1 to about 5 weight percent of sodium chloride and from about 0.05 to about 5 weight percent of an iron compound calculated as ferric oxide with a process gas containing sulfur dioxide, water and oxygen at a temperature of from between about 1000° F. and the fusion point of the reaction mixture until the sodium chloride content is reduced to a concentration of below about 0.3 percent by weight of the solid reactant and the iron compounds are converted to a white compound, whereby a white, free-flowing composition is produced.

9. A process for upgrading a crude salt cake which comprises treating a finely divided crude sodium sulfate from the Mannheim process containing from about 1 to about 5 weight percent of sodium chloride, from about 1 to about 5 weight percent of sodium bisulfate and from about 0.05 to about 5 weight percent of an iron compound calculated as ferric oxide with a process gas containing sulfur dioxide, water and oxygen at a temperature of from about 800° F. to about 1400° F. until the sodium chloride content is reduced to a concentration of below about 0.3 percent, and thereafter continuing said reaction at a temperature of from about 1000° F. to about 1400° F. to convert the iron compounds therein to a white compound whereby a white, free-flowing, substantially bisulfate-free composition is produced.

10. A process for upgrading a crude salt cake which comprises treating a finely divided crude sodium sulfate from the Mannheim process containing from 1 to about 5 weight percent sodium chloride, from about 1 to about 5 weight percent sodium bisulfate, and from about 0.05 to about 5 weight percent of an iron compound calculated as ferric oxide with a process gas containing sulfur dioxide, water and oxygen, at a temperature of from about 1000° F. to the fusion point of the reaction mixture until the sodium chloride content is reduced to a concentration of below about 0.3 weight percent of the solid reactant and the iron compounds therein are converted to a white compound, whereby a white, free-flowing, substantially bisulfate-free composition is produced.

11. A process for upgrading a crude potassium sulfate containing from 1 to 20 percent of potassium chloride, and from 0.05 to about 5 percent of an iron compound calculated as ferric oxide which comprises treating said crude sulfate in a finely divided state with a process gas containing sulfur dioxide, water and oxygen, maintaining the temperature of reaction during said treatment at from about 800 to about 1400° F. until the potassium chloride content is reduced to a concentration below about 0.3 percent by weight of the solid reactant, and thereafter continuing said reaction at a temperature above about 1000° F. to convert said iron compounds to a white compound, whereby a white, free-flowing, substantially bisulfate-free composition is produced.

References Cited in the file of this patent

UNITED STATES PATENTS

| | | |
|---|---|---|
| 2,336,180 | Lippman et al. | Dec. 7, 1943 |
| 2,706,144 | Cannon | Apr. 12, 1955 |

UNITED STATES PATENT OFFICE
CERTIFICATION OF CORRECTION

Patent No. 3,006,726                                          October 31, 1961

Wilbur Simon

It is hereby certified that error appears in the above numbered patent requiring correction and that the said Letters Patent should read as corrected below.

Column 2, line 26, for "metaal" read -- metal --; column 4, line 18, for "NaSO$_4$" read -- NaHSO$_4$--.

Signed and sealed this 10th day of April 1962.

(SEAL)
Attest:

ERNEST W. SWIDER
Attesting Officer

DAVID L. LADD
Commissioner of Patents